United States Patent
Derat

(10) Patent No.: US 10,707,976 B1
(45) Date of Patent: Jul. 7, 2020

(54) SYSTEM AND METHOD FOR NEAR-FIELD MEASUREMENT OF A DEVICE UNDER TEST IN A FAR-FIELD ENVIRONMENT

(71) Applicant: Rohde & Schwarz GmbH & Co. KG, Munich (DE)

(72) Inventor: Benoit Derat, Munich (DE)

(73) Assignee: Rohde & Schwarz GmbH & Co. KG, Munich (DE)

(*) Notice: Subject to any disclaimer, the term of this patent is extended or adjusted under 35 U.S.C. 154(b) by 0 days.

(21) Appl. No.: 16/542,410

(22) Filed: Aug. 16, 2019

(51) Int. Cl.
*H04B 17/29* (2015.01)
*H04B 17/318* (2015.01)

(52) U.S. Cl.
CPC ........... *H04B 17/29* (2015.01); *H04B 17/318* (2015.01)

(58) Field of Classification Search
CPC .............................. H04B 17/29; H04B 17/318
USPC ...................................................... 455/67.12
See application file for complete search history.

(56) References Cited

U.S. PATENT DOCUMENTS

| | | | | |
|---|---|---|---|---|
| 5,828,491 A * | 10/1998 | Neuman | ............... | G02B 5/1871 359/565 |
| 10,110,326 B1 | 10/2018 | Kyrolainen et al. | | |
| 2008/0018327 A1* | 1/2008 | Reynolds | ............... | B82Y 25/00 324/200 |
| 2016/0019884 A1* | 1/2016 | Xiao | ..................... | G10L 15/063 704/232 |

OTHER PUBLICATIONS

Keysight Technologies, "5G Boot Camp: 7 Key Measurement Challenges and Case Studies", pp. 1-90, Oct. 2018.
Keysight Technologies, "5G Boot Camp: 7 Key Measurement Challenges and Case Studies", pp. 91-180 Oct. 2018.

* cited by examiner

*Primary Examiner* — Eugene Yun
(74) *Attorney, Agent, or Firm* — Potomac Technology Law, LLC

(57) ABSTRACT

A system for near-field measurement of a device under test in a far-field environment is provided. The system comprises a communication unit adapted to establish a far-field connection with the device under test. The system further comprises a measuring unit adapted to measure a magnitude and a phase of at least two field components. Moreover, the system comprises a processing unit adapted to perform far-field to near-field and/or near-field to near-field transformation of the field components in order to calculate field components at a specific surface in the near-field of the device under test.

20 Claims, 4 Drawing Sheets

SYSTEM AND METHOD FOR NEAR-FIELD MEASUREMENT OF A DEVICE UNDER TEST IN A FAR-FIELD ENVIRONMENT

TECHNICAL FIELD

The invention relates to near-field measurement of a device under test in a far-field environment, especially for measuring near-field exposure of Fifth Generation New Radio (5G-NR) devices with dynamic beam-steering capability.

BACKGROUND

Generally, the evaluation of compliance of wireless devices with respect to regulatory exposure limits is performed according to IEC 62209, IEEE 1528 or IEC/IEEE 63195 standards. At frequencies above 10 GHz, the relevant metric is near-field power density. Over The Air (OTA) test systems are becoming mandatory for testing such wireless devices due to the integrated millimeter sized antennas. OTA tests also include anechoic chambers in order to create test environments that closely simulate the conditions in which the devices will operate. For example, the document U.S. Pat. No. 10,110,326 B1 shows a multi-probe anechoic chamber OTA test system to perform radiated testing of 5G base stations and 5G user equipment.

However, due to beam-steering capability of 5G-NR devices that operate over the millimeter wave range, the near-field power density measurement requires to access a specific test mode in order to control the beams. The device can therefore be locked within a certain operating state with a certain beam direction, and near-field measurements are carried out at a defined grid in air near the device. The dependency on particular test modes results in the expense of network resources and further leads to a complex test system.

Accordingly, there is a need to provide a system and a method for near-field exposure measurements of a device under test, especially for evaluating near-field power density in a simplified manner without the necessity for specific test modes.

SUMMARY

Embodiments of the present invention advantageously address the foregoing requirements and needs, as well as others, by providing a system and a method for near-field exposure measurements of a device under test, especially for evaluating near-field power density in a simplified manner without the necessity for specific test modes.

According to a first aspect of the invention, a system for near-field measurement of a device under test in a far-field environment is provided. The system comprises a communication unit adapted to establish a far-field connection with the device under test. The system further comprises a measuring unit adapted to measure a magnitude and a phase of at least two field components. Moreover, the system comprises a processing unit adapted to perform far-field to near-field and/or near-field to near-field transformation of the field components in order to calculate field components at a specific surface in the near-field of the device under test.

Therefore, a link is established with the device under test in an OTA far-field test environment, preferably in the same way as defined by the Third Generation Partnership Project (3GPP) standards. Upon acknowledging this far-field link, the device under test can advantageously operate its beam correspondence algorithm in order to configure its beam orientation. Furthermore, the measurement of field components can be carried out either in the near-field or in the far-field of the device under test. In both cases, the field components are advantageously transformed into near-field components, by means of near-field to near-field (NF-NF) or far-field to near-field (FF-NF) transformation algorithms respectively, for any specific surface around the device under test. Consequently, near-field measurements can be carried out in a simplified manner.

According to a first preferred implementation form of said first aspect of the invention, the at least two field components are orthogonal field components, preferably orthogonal electric field components. Advantageously, the measured orthogonal field components provide sufficient basis to simulate the near-field patterns, for instance the direct spherical near-field pattern at a specific surface around the device under test.

According to a second preferred implementation form of said first aspect of the invention, the processing unit is further adapted to calculate respective magnetic field components from the orthogonal electric field components. In this context, it is further possible to measure the orthogonal magnetic field components and to analogously calculate the respective electric field components, which advantageously facilitates greater measurement flexibility.

According to a further preferred implementation form of said first aspect of the invention, the processing unit is further adapted to determine the Poynting vector at the specific surface in the near-field of the device under test based on the electric and magnetic field components. The Poynting vector can be determined as an instantaneous quantity that represents instantaneous power flow due to instantaneous electric and magnetic fields. Additionally or alternatively, a time-averaged Poynting vector can be determined, particularly with respect to the near-field radiation which is generally incoherent due to the superposition of electric and magnetic fields at different frequencies and amplitudes. Advantageously, the near-field power flow patterns can be effectively identified.

According to a further preferred implementation form of said first aspect of the invention, the processing unit is further adapted to calculate a power density at the specific surface in the near-field of the device under test from the Poynting vector. Advantageously, the near-field power density at a surface around the device under test can be evaluated in a simplified manner.

According to a further preferred implementation form of said first aspect of the invention, the processing unit is further adapted to repeat the far-field to near-field and/or near-field to near-field transformation for at least one additional surface in the near-field of the device under test. Advantageously, the measurement complexity is significantly reduced.

According to a further preferred implementation form of said first aspect of the invention, the processing unit is further adapted to calculate the power density from the Poynting vector for the at least one additional surface in the near-field of the device under test. Advantageously, the near-field power density at any surface around the device under test can be evaluated.

According to a further preferred implementation form of said first aspect of the invention, the communication unit is further adapted to transmit beamforming commands to the device under test thereby allowing the device under test to lock the beamforming alignment at a particular direction. Therefore, only the beam-lock operation is required for the device under test, which significantly reduces the conventional network resource usage.

According to a further preferred implementation form of said first aspect of the invention, the processing unit is further adapted to calculate the power density while the beamforming alignment of the device under test is being locked at the particular direction. Advantageously, for instance measurement accuracy and reliability are further increased.

According to a further preferred implementation form of said first aspect of the invention, the system further comprises a positioner adapted to orient the device under test along at least two axis. Advantageously, the orthogonal field components are measured with a greater accuracy.

According to a further preferred implementation form of said first aspect of the invention, the system further comprises a radio frequency chamber, preferably an anechoic chamber. Advantageously, the measurement reliability is improved significantly due to, for instance the standing wave reduction capability of the anechoic chamber.

According to a second aspect of the invention, a method for near-field measurement of a device under test in a far-field environment is provided. The method comprises the steps of establishing a far-field connection with the device under test, measuring a magnitude and a phase of at least two field components, and performing far-field to near-field and/or near-field to near-field transformation of the field components in order to calculate field components at a specific surface in the near-field of the device under test. Advantageously, near-field measurements can be carried out in a simplified manner.

According to a first preferred implementation form of said second aspect of the invention, the at least two field components are orthogonal field components, preferably orthogonal electric field components. Advantageously, the measured orthogonal field components provide sufficient basis to simulate the near-field pattern, for instance the direct spherical near-field pattern at a specific surface around the device under test.

According to a second preferred implementation form of said second aspect of the invention, the method further comprises the step of calculating respective magnetic field components from the orthogonal electric field components. Additionally or alternatively, it is further possible to measure the orthogonal magnetic field components and to analogously calculate the respective electric field components, which advantageously facilitates greater measurement flexibility.

According to a further preferred implementation form of said second aspect of the invention, the method further comprises the step of determining the Poynting vector at the specific surface in the near-field of the device under test based on the electric and magnetic field components. Advantageously, the near-field power flow patterns can be effectively identified.

According to a further preferred implementation form of said second aspect of the invention, the method further comprises the step of calculating a power density at the specific surface in the near-field of the device under test from the Poynting vector. Advantageously, the near-field power density at a surface around the device under test can be evaluated in a simplified manner.

According to a further preferred implementation form of said second aspect of the invention, the method further comprises the step of repeating the far-field to near-field and/or near-field to near-field transformation for at least one additional surface in the near-field of the device under test. Advantageously, the measurement complexity is significantly reduced.

According to a further preferred implementation form of said second aspect of the invention, the method further comprises the step of calculating the power density from the Poynting vector for the at least one additional surface in the near-field of the device under test. Advantageously, the near-field power density at any surface around the device under test can be evaluated.

According to a further preferred implementation form of said second aspect of the invention, the method further comprises the step of transmitting beamforming commands to the device under test thereby allowing the device under test to lock the beamforming alignment at a particular direction. Advantageously, only the beam lock operation is required for the device under test, which significantly reduce the conventional network resource usage.

According to a further preferred implementation form of said second aspect of the invention, the method further comprises the step of calculating the power density while the beamforming alignment of the device under test is being locked at the particular direction. Advantageously, for instance measurement accuracy and reliability are further increased.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

Exemplary embodiments of the invention are now further explained with respect to the drawings by way of example only, and not for limitation. In the drawings.

DETAILED DESCRIPTION

A processor, unit, module or component (as referred to herein) may be composed of software component(s), which are stored in a memory or other computer-readable storage medium, and executed by one or more processors or CPUs of the respective devices. A module or unit may alternatively be composed of hardware component(s) or firmware component(s), or a combination of hardware, firmware and/or software components. Further, with respect to the various example embodiments described herein, while certain of the functions are described as being performed by certain components or modules (or combinations thereof), such descriptions are provided as examples and are thus not intended to be limiting. Accordingly, any such functions may be envisioned as being performed by other components or modules (or combinations thereof), without departing from the spirit and general scope of the present invention. Moreover, the methods, processes and approaches described herein may be processor-implemented using processing circuitry that may comprise one or more microprocessors, application specific integrated circuits (ASICs), field programmable gate arrays (FPGAs), or other devices operable to be configured or programmed to implement the systems and/or methods described herein. For implementation on such devices that are operable to execute software instructions, the flow diagrams and methods described herein may be implemented in processor instructions stored in a computer-readable medium, such as executable software stored in computer memory storage.

Reference will now be made in detail to the embodiments of the present invention, examples of which are illustrated in the accompanying drawings. However, the following embodiments of the present invention may be variously modified and the range of the present invention is not limited by the following embodiments.

Figure 1:
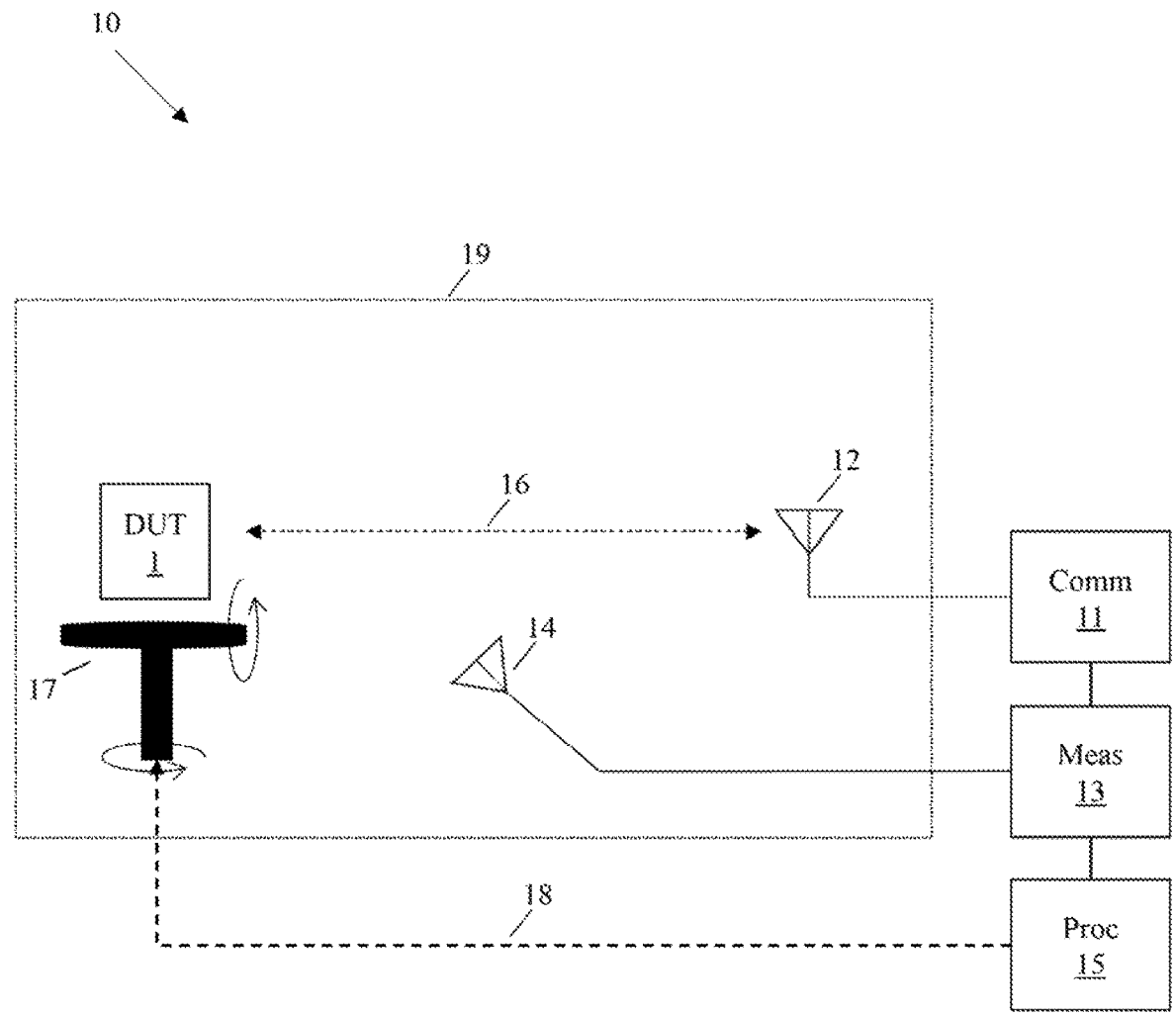
FIG. 1 shows a first exemplary embodiment of the system according to the first aspect of the invention.

In FIG. 1, a first exemplary embodiment of the system 10 according to the first aspect of the invention is illustrated. The system 10 preferably corresponds to a direct far-field test system that comprises a communication unit 11 connected to an antenna 12. The communication unit 11 therefore establishes a far-field link 16 between the antenna 12 and a device under test 1, for instance in an analogous way as defined by the 3GPP standards. In this context, the communication unit 11 comprises transmission and reception means along with antenna drive circuitry, which may act together as a single transceiver module and thereby connected to the antenna 12. The distance between the antenna 12 and the communication unit 11 is kept very short in order to prevent signal degradation.

With the sight of the far-field link, the device under test 1 can operate its beam correspondence algorithm in order to facilitate the beam-lock procedure. The communication unit 11 then activates the beam-lock operation of the device under test 1 by transmitting the beam-lock command towards the device under test 1.

The system 10 further comprises a measuring unit 13 connected to a probe antenna or probe 14 and thereby measures amplitude and phase of field components, for instance the orthogonal electric field components $E_\varphi$, $E_\theta$. The measurement can be carried out by moving the probe 14 either in the near-field or in the far-field of the device under test 1. Additionally, the measuring unit 13 may connected to the communication unit 11 thereby further utilizing the antenna 12, for instance for the far-field patterns. Therefore, the measuring unit 13 may act as a stand-alone detecting module, for instance a sensor module with an array of sensors. Alternatively, the measuring unit 13 may be an integral module of the communication unit 11 with additional measuring probes for near-field probing.

The system 10 further comprises a processing unit 15, connected to the measuring unit 13 and performs detailed analysis on the measured field quantities. In this context, the processing unit 15 applies field transformation algorithms, for instance NF-NF or FF-NF transformation algorithm in order to simulate near-field patterns around the device under test 1 for a given surface. The processing unit 15 further calculates the respective magnetic field components from the measured orthogonal electric field components, for instance by using the Maxwell-Faraday equation as follows:

$$\Delta \times E = -\frac{\partial B}{\partial t}$$

where,
$\Delta \times$ is the curl operator
E is the electric field, and
B is the magnetic field.

Alternatively, if the measuring unit 13 directly measures the magnetic field components, either in near-field or in far-field, the processing unit 15 analogously calculates the respective electric field components. In either case, the processing unit 15 is able to determine the Poynting vector from the electric and magnetic field components and thereby evaluates a power density at a surface in the near-field of the device under test 1.

It is to be noted that, the processing unit 15 and the measuring unit 13 are not required to be connected via cables, a wireless connection in the form of Wireless Local Area Network (WLAN), Web-based interface and so on are also viable. The processing unit 15 may also be referred to as microcontrollers, microprocessors, microcomputers, etc. The processing unit 15 may further be configured in hardware, firmware, software, or their combination.

The system 10 may optionally comprise a memory unit, connected to the processing unit 15 and the measuring unit 13. The memory unit can thereby store the measured quantities, programs required for signal processing and controlling of the processing unit 15 and may temporarily store input and output information.

The system 10 further comprises a positioner 17 on which the device under test 1 is arranged in order to orient the device under test 1 with respect to the azimuth and elevation direction of the antennas 12, 14. The positioner 17 may be connected to the processing unit 15 through a signal line 18 for receiving control commands. The system also comprises an anechoic chamber 19 in order to facilitate OTA test environment for the device under test 1. The anechoic chamber 19 encompasses the device under test 1 and the positioner 17 along with the antennas 12, 14.

Figure 2:
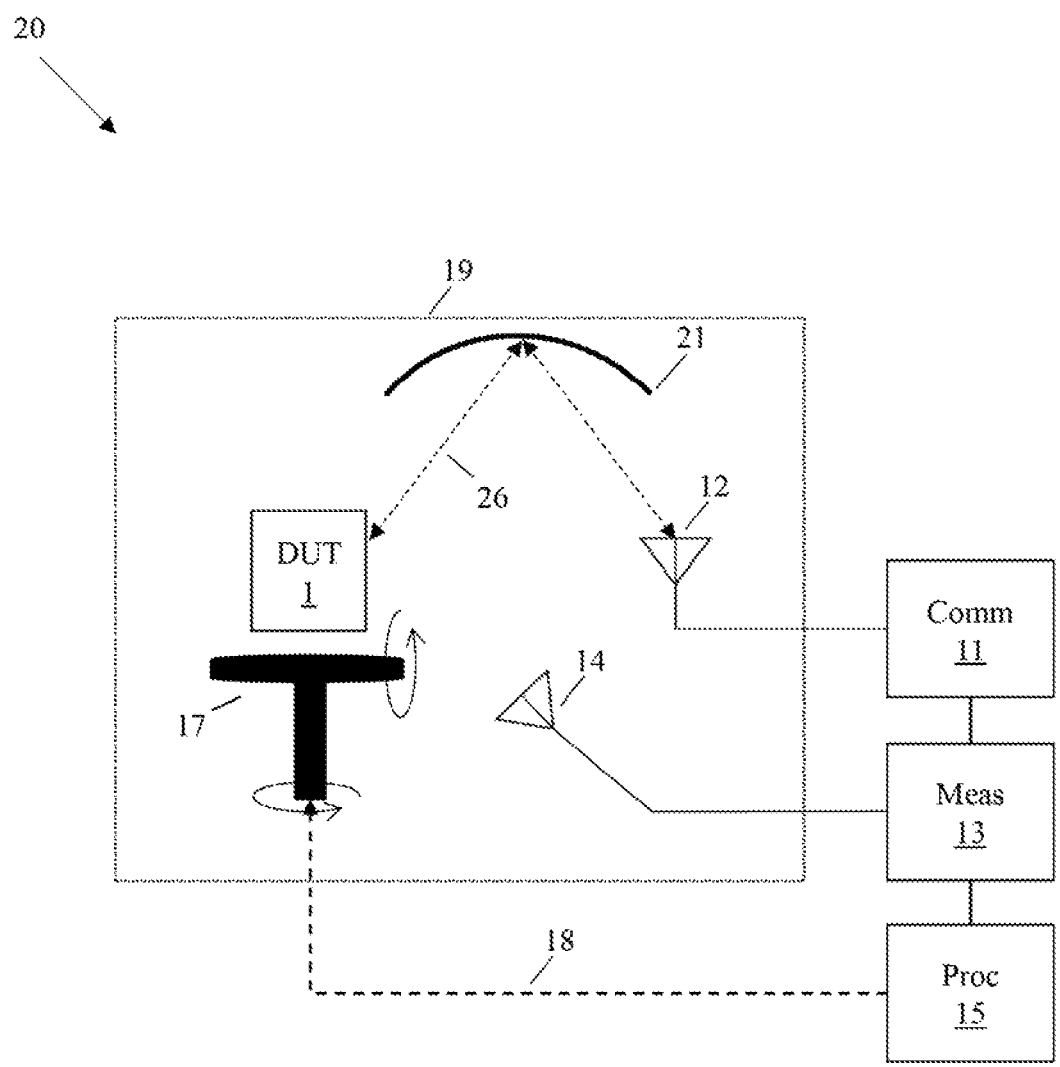
FIG. 2 shows a second exemplary embodiment of the system according to the first aspect of the invention.

In FIG. 2, a second exemplary embodiment of the system 20 according to the first aspect of the invention is illustrated. The system 20 differs from the system 10 of FIG. 1 in that it comprises a reflector 21 within the anechoic chamber 19 in order to simulate indirect far-field test environment for the device under test 1, for instance in a way similar to the Compact Antenna Test Range (CATR). In this context, the far-field link 26 is established by the communication unit 11 through the plane-wave coming from the reflector 21.

Figure 3:
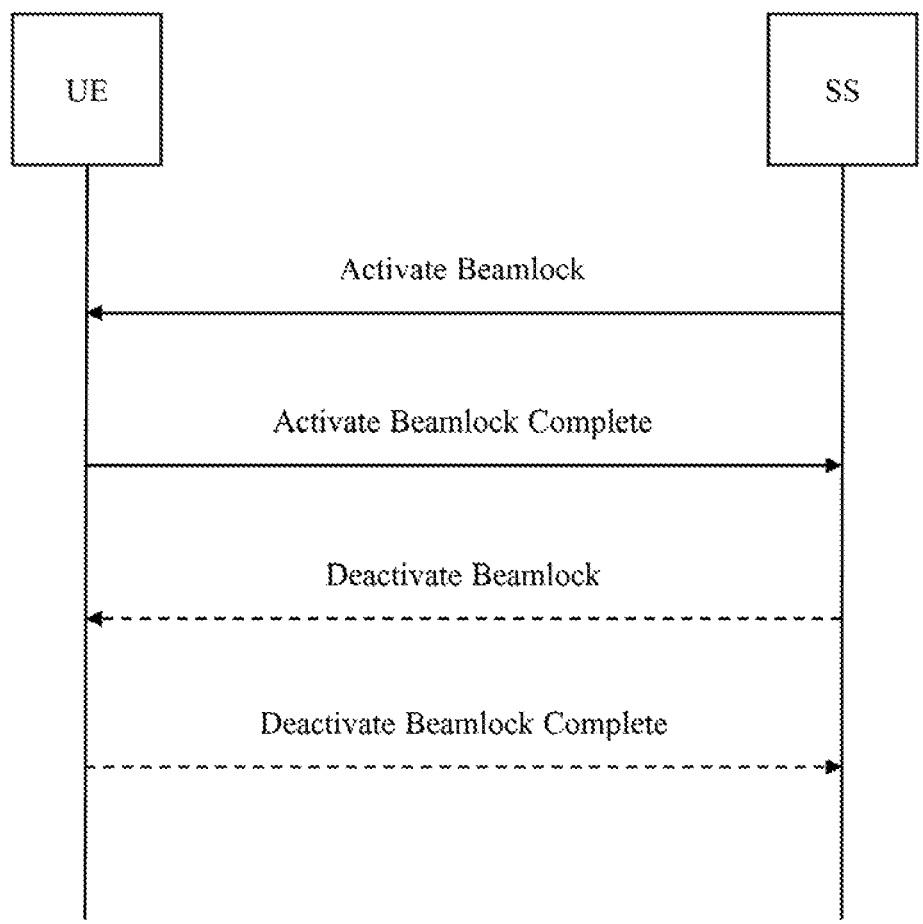
FIG. 3 shows a Beam-lock test mode procedure for a user equipment by way of an example.

In FIG. 3, a Beam-lock test mode procedure for a user equipment is illustrated by way of an example. The user equipment (UE) Beam-lock test function is intended for making the UE to lock the UE antenna pattern once it has formed a beam towards the base station (SS) direction following the identification procedure. The SS uses the UE Beam-lock test mode activation procedure to command the UE to lock the antenna pattern. The activation procedure can be applied to the transmitter and receiver beams of the UE either simultaneously or independently. The procedure is preferred for UEs operating in Frequency Range 2 (FR2) according to the 5G-NR standards. In order to deactivate the Beam-lock test mode, the SS uses the Beam-lock deactivation procedure to command the UE to re-track the beam towards the SS direction.

For initiating the Beam-lock procedure, the SS requests the UE to activate beam-lock by transmitting an ACTIVATE BEAMLOCK message. Upon reception of the request, the UE, preferably operating in FR2 and in a connected state, locks the antenna pattern towards the SS and transmits an ACTIVATE BEAMLOCK COMPLETE message towards the SS. Analogously, in order to deactivate the beam-lock, the SS requests the UE by transmitting a DEACTIVATE BEAMLOCK message and the UE acknowledges the message with a response of DEACTIVATE BEAMLOCK COMPLETE and thereby unlocks the beam towards the SS.

Figure 4:
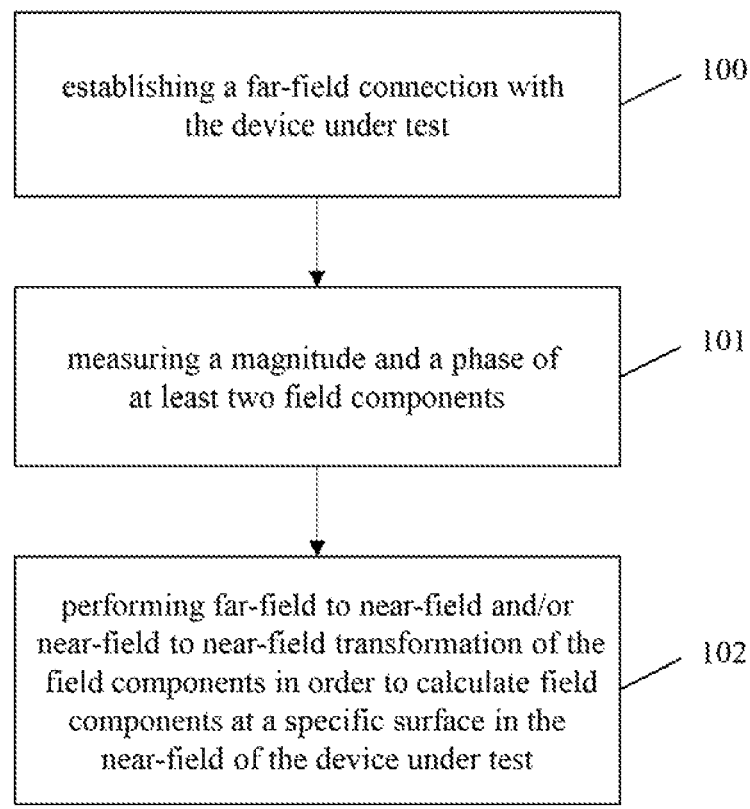
FIG. 4 shows an exemplary embodiment of the method according to the second aspect of the invention.

In FIG. 4, an exemplary embodiment of the method according to the first aspect of the invention is illustrated. In a first step 100, a far-field connection is established with the device under test. In a second step 101, a magnitude and a phase of at least two field components are measured. In a third step 102, far-field to near-field and/or near-field to near-field transformation of the field components is performed in order to calculate field components at a specific surface in the near-field of the device under test. In this context, the at least two field components are orthogonal field components, preferably orthogonal electric field components.

In addition to this, the method further comprises the step of calculating respective magnetic field components from the orthogonal electric field components. Moreover, the method further comprises the step of determining the Poynting vector at the specific surface in the near-field of the device under test based on the electric and magnetic field components.

It might be further advantageous if the method further comprises the step of calculating a power density at the specific surface in the near-field of the device under test from the Poynting vector.

Additionally or alternatively, the method further comprises the step of repeating the far-field to near-field and/or near-field to near-field transformation for at least one additional surface in the near-field of the device under test.

It might be further advantageous if the method further comprises the step of calculating the power density from the Poynting vector for the at least one additional surface in the near-field of the device under test.

Moreover, the method further comprises the step of transmitting beamforming commands to the device under test thereby allowing the device under test to lock the beamforming alignment at a particular direction.

In addition to this, the method further comprises the step of calculating the power density while the beamforming alignment of the device under test is being locked at the particular direction.

The embodiments of the present invention can be implemented by hardware, software, or any combination thereof. Various embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A system for near-field measurement of a device under test in a far-field environment comprising:
    a communication unit adapted to establish a far-field connection with the device under test;
    a measuring unit adapted to measure a magnitude and a phase of at least two field components; and
    a processing unit adapted to perform far-field to near-field and/or near-field to near-field transformation of the field components in order to calculate field components for a specific surface in the near-field of the device under test; and
    wherein the measuring unit is adapted to perform the measurement of the magnitude and the phase of the at least two field components either in the near-field or in the far-field of the device under test, where in both cases the measured field components are transformed into field components for the specific surface in the near-field of the device under test.

2. The system according to claim 1, wherein the at least two field components are orthogonal electric field components.

3. The system according to claim 2, wherein the processing unit is further adapted to calculate respective magnetic field components based on the orthogonal electric field components.

4. The system according to claim 3, wherein the processing unit is further adapted to determine a Poynting vector for the specific surface in the near-field of the device under test based on the electric and magnetic field components.

5. The system according to claim 4, wherein the processing unit is further adapted to calculate a power density for the specific surface in the near-field of the device under test based on the Poynting vector for the specific surface in the near-field of the device under test.

6. The system according to claim 1, wherein the processing unit is further adapted to repeat the far-field to near-field and/or near-field to near-field transformation of the field components in order to calculate field components for at least one additional surface in the near-field of the device under test.

7. The system according to claim 6, wherein the at least two field components are orthogonal electric field components, and wherein the processing unit is further adapted to calculate respective magnetic field components based on the orthogonal electric field components, to determine a Poynting vector for the at least one additional surface in the near-field of the device under test based on the electric and magnetic field components, and to calculate a power density for the at least one additional surface in the near-field of the device under test based on the Poynting vector for the at least one additional surface in the near-field of the device under test.

8. The system according to claim 1, wherein the communication unit is further adapted to transmit beamforming commands to the device under test to allow the device under test to lock a beamforming alignment of the device under test at a particular direction.

9. The system according to claim 8, wherein the processing unit is further adapted to calculate a power density while the beamforming alignment of the device under test is being locked at the particular direction.

10. The system according to claim 1, wherein the system further comprises:
   a positioner adapted to orient the device under test along at least two axes.

11. The system according to claim 1, wherein the system further comprises:
   an anechoic chamber.

12. A method for near-field measurement of a device under test in a far-field environment comprises the steps of:
   establishing a far-field connection with the device under test;
   measuring a magnitude and a phase of at least two field components; and
   performing far-field to near-field and/or near-field to near-field transformation of the field components in order to calculate field components for a specific surface in the near-field of the device under test; and
   wherein the measurement of the magnitude and the phase of the at least two field components is performed either in the near-field or in the far-field of the device under test, where in both cases the measured field components are transformed into field components for the specific surface in the near-field of the device under test.

13. The method according to claim 12, wherein the at least two field components are orthogonal electric field components.

14. The method according to claim 13, wherein the method further comprises the step of:
   calculating respective magnetic field components based on the orthogonal electric field components.

15. The method according to claim 14, wherein the method further comprises the step of:
   determining a Poynting vector for the specific surface in the near-field of the device under test based on the electric and magnetic field components.

16. The method according to claim 15, wherein the method further comprises the step of:
   calculating a power density for the specific surface in the near-field of the device under test based on the Poynting vector for the specific surface in the near-field of the device under test.

17. The method according to claim 12, wherein the method further comprises the step of:
   repeating the far-field to near-field and/or near-field to near-field transformation of the field components in order to calculate field components for at least one additional surface in the near-field of the device under test.

18. The method according to claim 17, wherein the at least two field components are orthogonal electric field components, and wherein the method further comprises the steps of:
   calculating respective magnetic field components based on the orthogonal electric field components;
   determining a Poynting vector for the at least one additional surface in the near-field of the device under test based on the electric and magnetic field components; and
   calculating a power density for the at least one additional surface in the near-field of the device under test based on the Poynting vector for the at least one additional surface in the near-field of the device under test.

19. The method according to claim 12, wherein the method further comprises the step of:
   transmitting beamforming commands to the device under test to allow the device under test to lock a beamforming alignment of the device under test at a particular direction.

20. The method according to claim 19, wherein the method further comprises the step of:
   calculating a power density while the beamforming alignment of the device under test is being locked at the particular direction.

* * * * *